United States Patent
Nagoshi et al.

[15] 3,642,555
[45] Feb. 15, 1972

[54] AUTOMATIC TAPE SPLICER

[72] Inventors: Kazuhiro Nagoshi; Yoshimasa Yagi, both of Sonezakikami, Kita-ku, Osaka-shi, Osaka-fu, Japan

[73] Assignee: Kabushiki Kaisha Satomi Denki Shokai, Osaka-shi, Osaka-fu, Japan

[22] Filed: Apr. 18, 1969

[21] Appl. No.: 817,421

[30] Foreign Application Priority Data

Apr. 20, 1968 Japan......43/26479
Apr. 20, 1968 Japan......43/26480

[52] U.S. Cl. ............156/505, 156/502, 156/157
[51] Int. Cl. ............B31f 5/06, B65h 69/06, G03f 15/04
[58] Field of Search ............156/502–510, 157

[56] References Cited

UNITED STATES PATENTS

| | | | |
|---|---|---|---|
| 2,467,609 | 4/1949 | Castay | 156/506 |
| 2,475,351 | 6/1949 | Castay | 156/507 |
| 2,516,602 | 6/1950 | Snyder | 156/507 |
| 3,169,896 | 2/1965 | Dresser | 156/507 |
| 3,251,935 | 5/1966 | Hull | 156/507 |
| 3,130,100 | 4/1964 | Hasselquist | 156/507 X |

*Primary Examiner*—Benjamin A. Borchelt
*Assistant Examiner*—J. J. Devitt
*Attorney*—Craig, Antonelli and Hill

[57] ABSTRACT

An automatic tape splicer in which the tape-splicing operation to connect or joint two lengths of tape, film or the like together end-to-end may be fully automated, including five steps of determining particular positions of each tape to be connected, cutting away the lugs of each tape at the connecting positions, butting the cut end of the tapes against each other so as to adhere to each other, bonding a splice tape on the butted end of the tapes, and finally cutting away the lugs of the splice tape at both sides of the tape.

6 Claims, 31 Drawing Figures

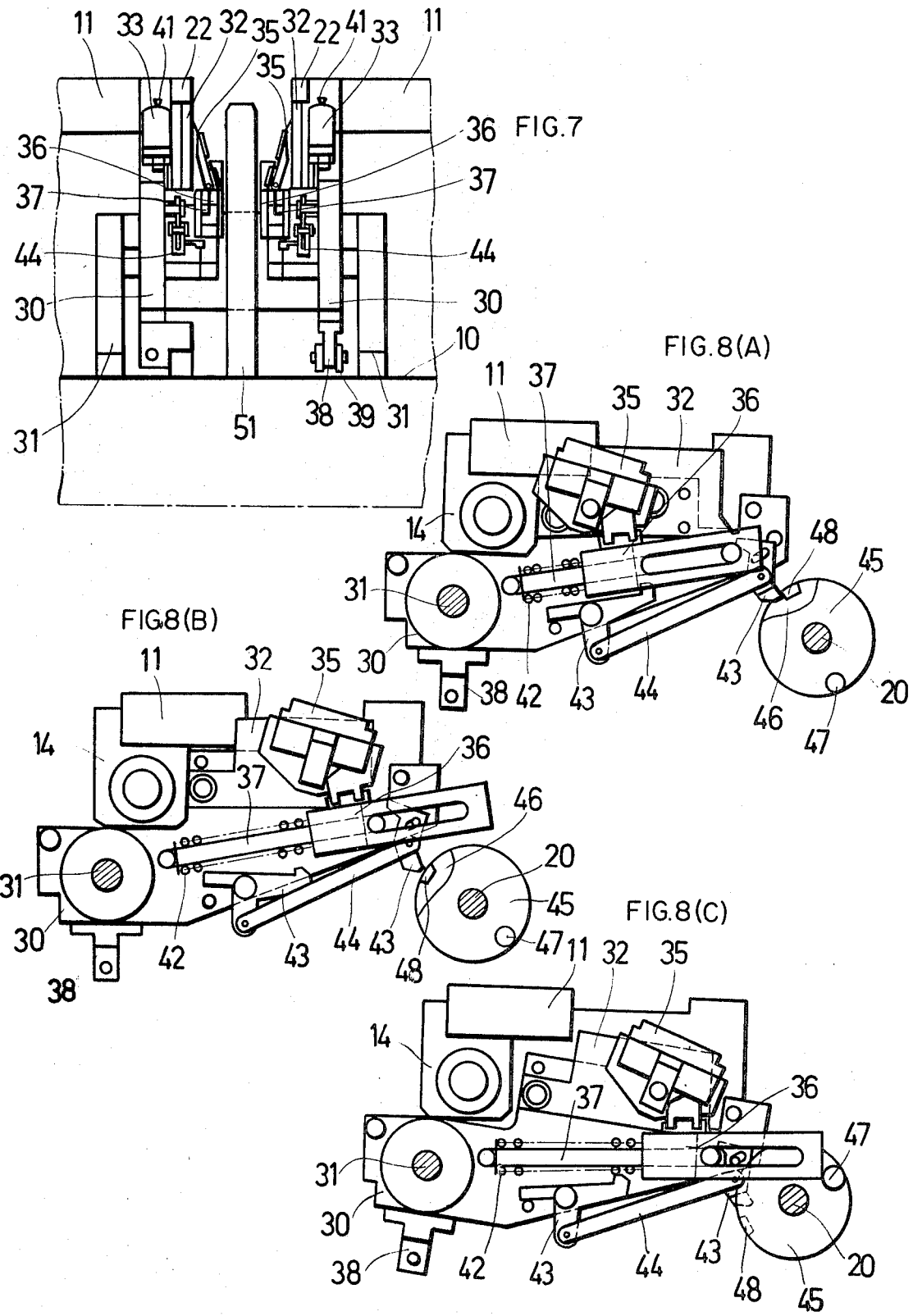

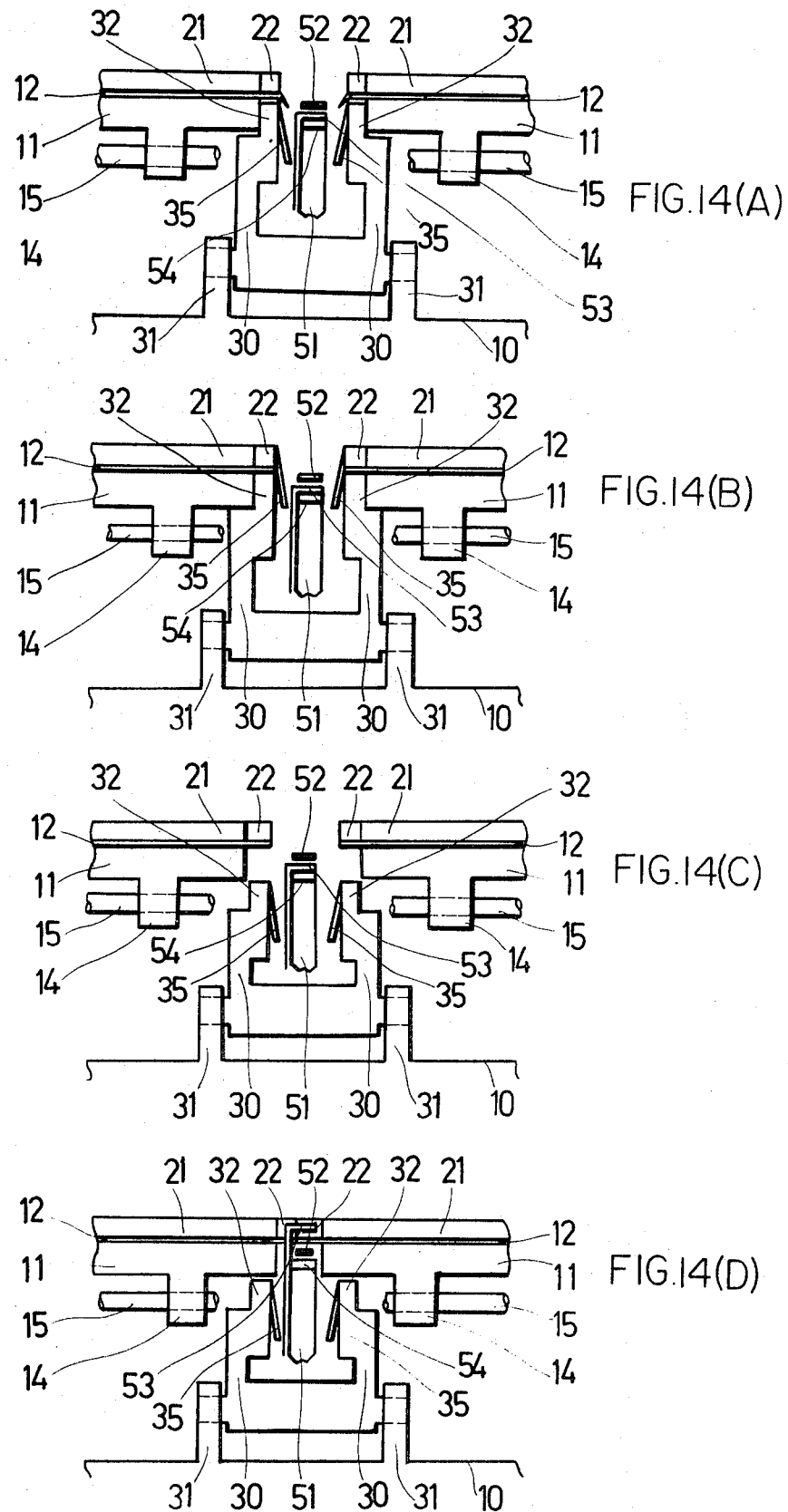

AUTOMATIC TAPE SPLICER

This invention relates to an automatic tape splicer in which the tape-splicing operation to connect or joint two lengths of tape, film or the like together end to end may be fully automated without a time lag in sequential operations of the mechanisms.

As generally well known to those skilled in the art, upon editing or repairing, hereinafter referred to as only "editing," of magnetic tapes, photographic films and the like, hereinafter referred to as only "tape," it is required to splice the tapes, namely, to carry out successive operations including the steps of determining particular positions of each tape to be connected, shearing off the lugs of each tape at the connecting position, butting the sheared end of the tapes against each other so as to adhere to each other, bonding a splice tape on the butted end of the tapes, and finally cutting out the lugs of the splice tape at both sides of the tape. For example, in an editing or splicing operation of video tapes 4 having thereon a video recording track 1 as well as a sound control track 3 as shown in FIG. 1 (A), for the purpose of TV programming in which required portions of track are selected in one line while unnecessary portions are cut out, an operational cycle required to obtain any one spliced portion of the tapes for end-to-end connecting or jointing thereof, hereinafter referred to as only "the tape-splicing operation" includes the five successive steps of detecting the editing pulses 3' on the control tracks 3 of each tape 4 to be connected by means of detectors 5 as shown in FIG. 1 (B), cutting out the lugs 4' and 4' of each tape at the detected pulse 3' transversely of the video recording track 1 by the cutters 6 and 6 as shown in FIG. 1 (C), butting the cut end of the tapes 4 and 4 against each other so as to adhere to each other as shown in FIG. 1 (D), bonding a splice tape 7 on the butted end of the tapes 4 and 4 as shown in FIG. 1 (E), and finally shearing off the lugs 7' and 7' of the splice tape 7 at both sides of the tape 4 by cutters 8 as shown in FIG. 1 (F).

Prior to the invention, however, for such editing of the tape in the TV programming the troublesome and time-consuming handwork by a skilled person in particular is required to accomplish successive steps of exposing the editing pulses on the track of each tape by coating the magnetic iron powder on the surface thereof, cutting out the end of tapes put one upon another at the editing pulses by means of a hand knife, removing the cut pieces from the tape ends by separating one from the other, butting the cut end of the tapes against each other in line so as to adhere, bonding a splice tape on the butted end of the tapes, and finally cutting off the lugs of the splice tape at both sides of the tape by means of hand knife. Furthermore, in such way, it was almost inevitable that every spliced portion of the spliced tape may not be obtained in uniform quality and down slipping of the tracks between those of the two connected tapes is of frequent occurrence, whereby noises are also produced during the practical use of the tape.

This invention has for its object the provision of an automatic tape splicer capable of working automatically the tape-splicing operation as heretofore described, including all five successive steps of determining the position to be connected, cutting out the lugs at the connecting position, butting the cut ends, bonding a splice tape and cutting away the lugs of the splice tape.

The automatic tape splicer provided by the invention can be applied to editing of tape, film, or the like, such as various kinds of magnetic tapes, photographic films, for connecting or jointing the same together end to end. Furthermore, the splicer of this invention is designed that the mechanisms for the five steps of the tape-splicing operation are driven in sequential operation as one unity to perform its intended functions in an entirely satisfactory and trouble-free manner so that the splicing of the tapes may be fast, efficient and accurate and the spliced tape may be obtained in good uniform quality without injury or damage.

This invention provides a splicer of the character indicated that is simple, compact and lightweight in design: that is durable in construction; and that is reasonable in manufacturing cost.

These and other objects and aspects of the invention will be more clearly understood from the following description of an embodiment of the invention shown, by way of example only, in the accompanying drawings in which like reference numerals denote corresponding parts throughout the several views:

FIGS. 1, (A) to (F), explain schematically the operations of the mechanism for end-to-end connecting separated video tapes, step by step;

FIG. 7 is a fragmentary side view of FIG. 5;

Figure 3:
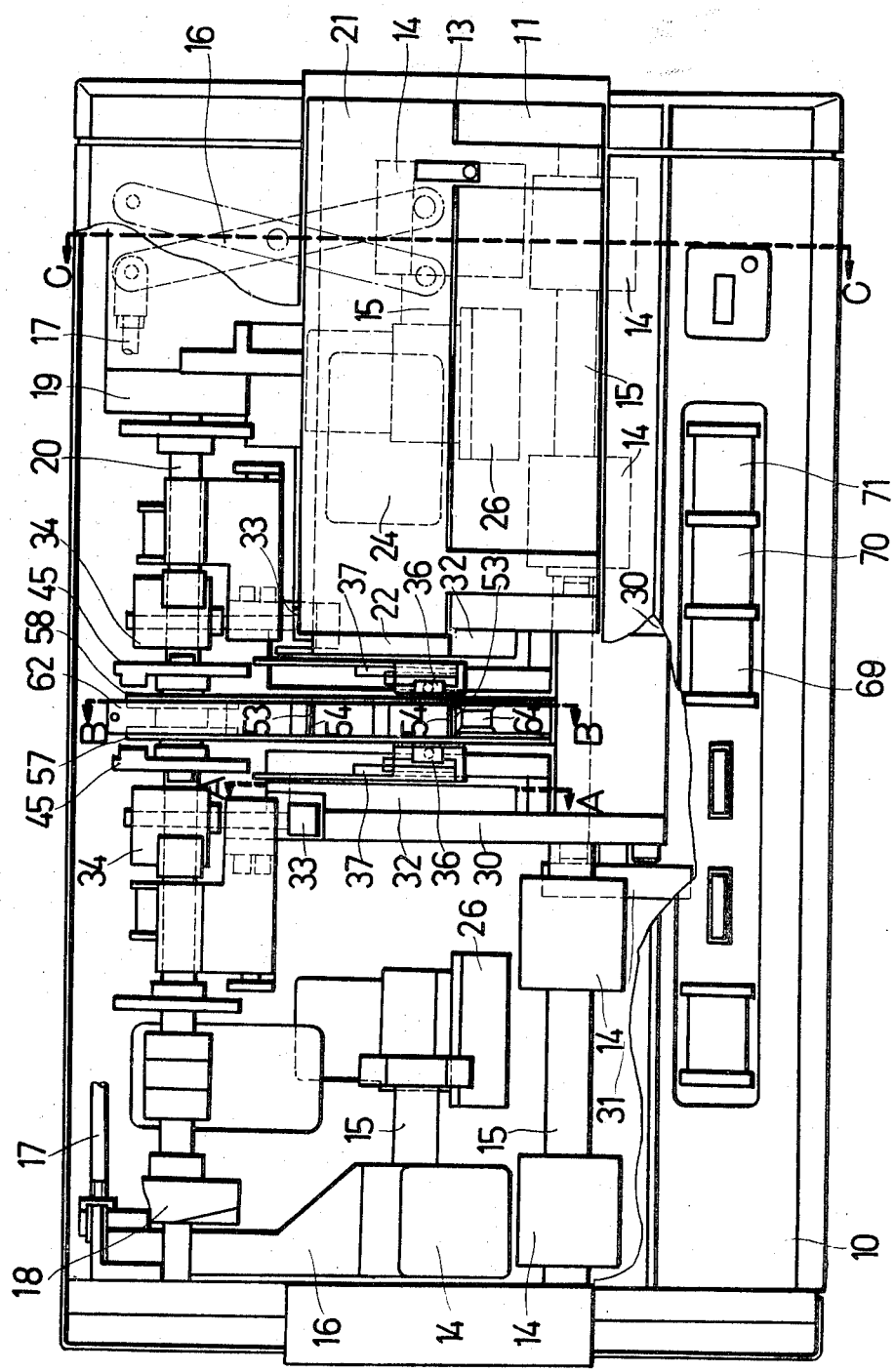
FIG. 3 is a plan view, of which a portion is broken away, of an embodiment of an automatic tape splicer according to the invention.
Figure 6:
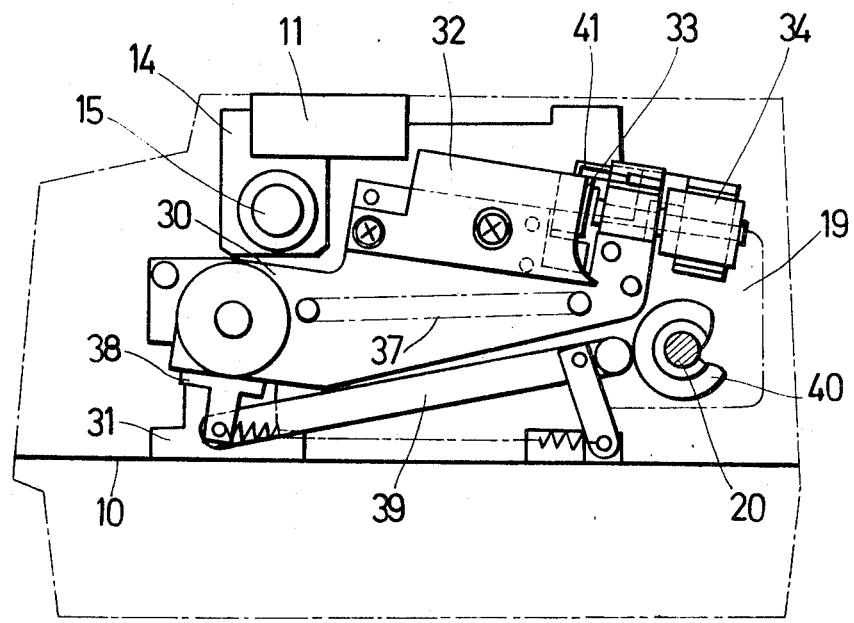
FIG. 6 is a cross-sectional view showing a condition in which a cutter support for a video tape cutter has been moved to its lower position of FIG. 5.
Figure 9:
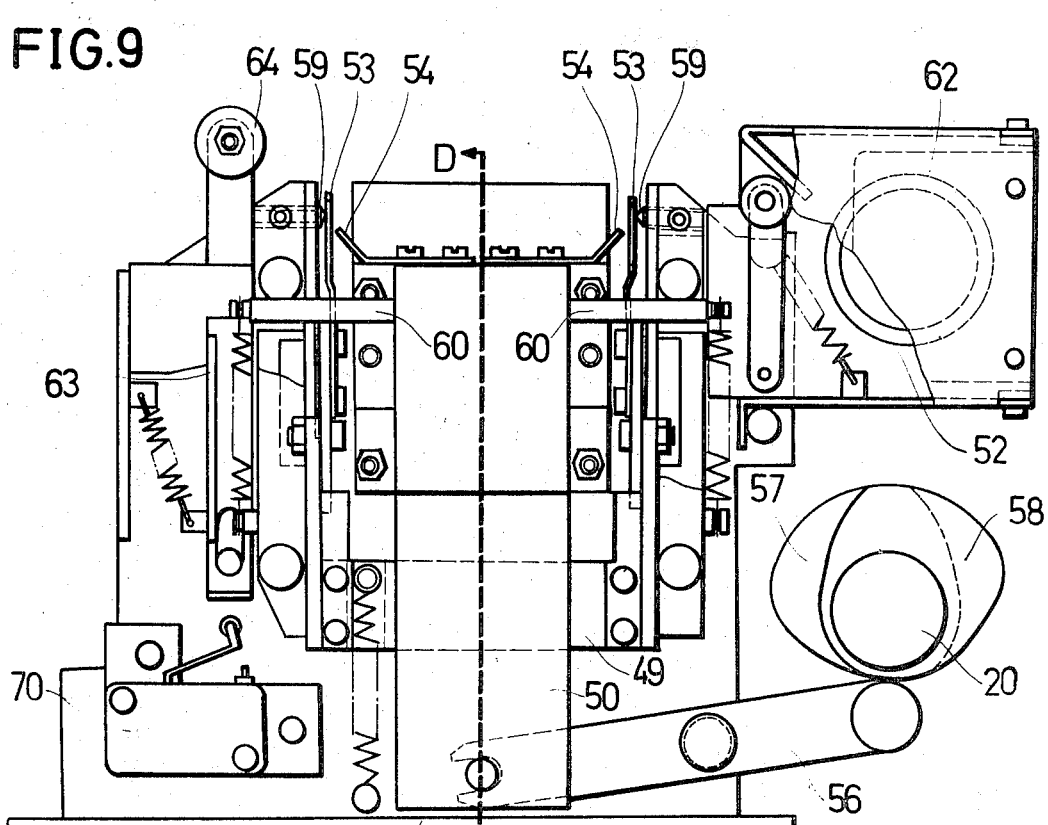
Figure 10:
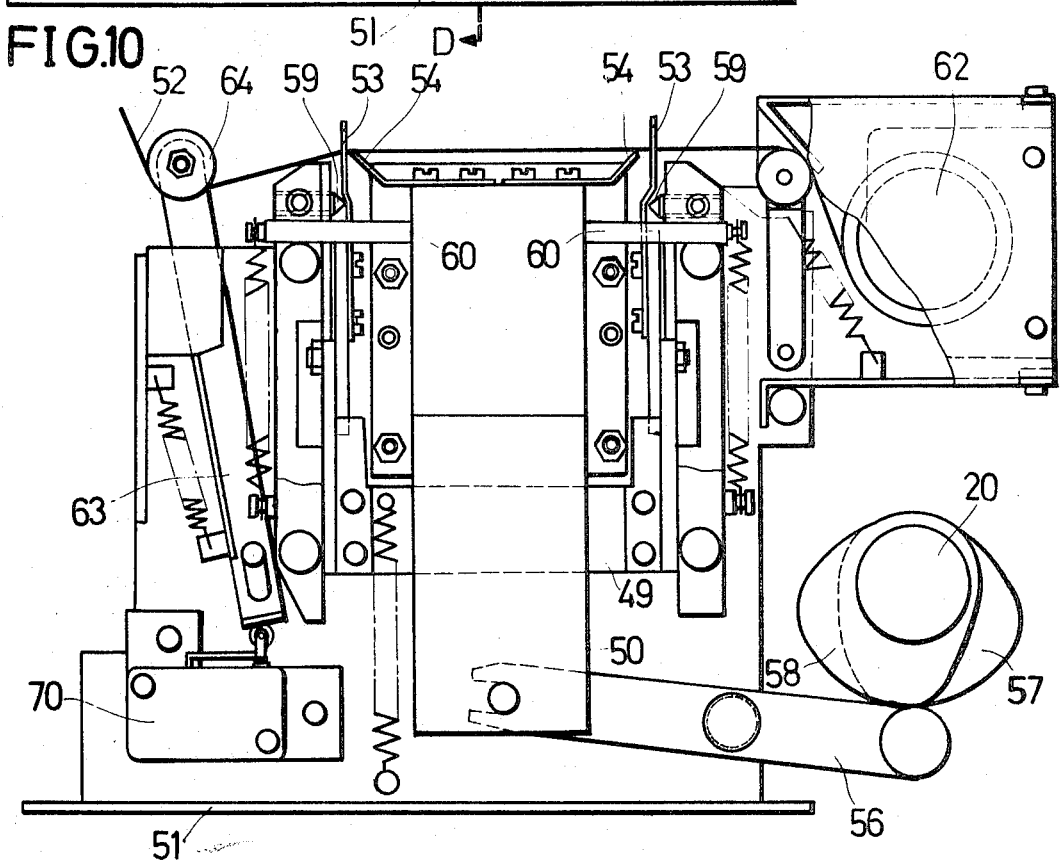
Figure 11:
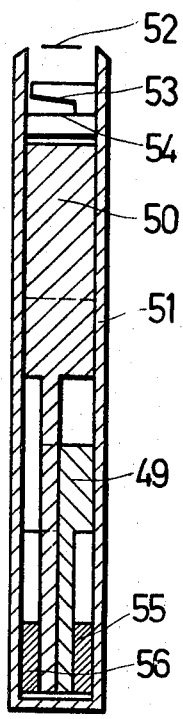
Figure 13:
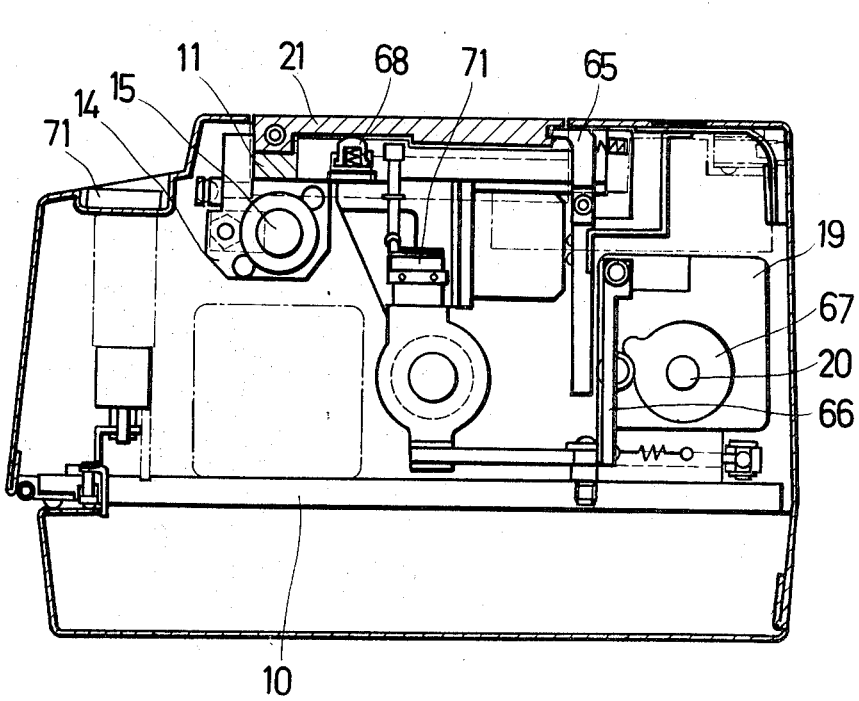
Figure 12A:
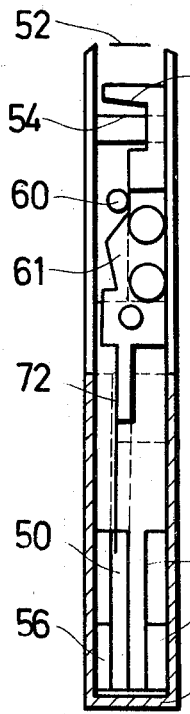
Figure 12B:
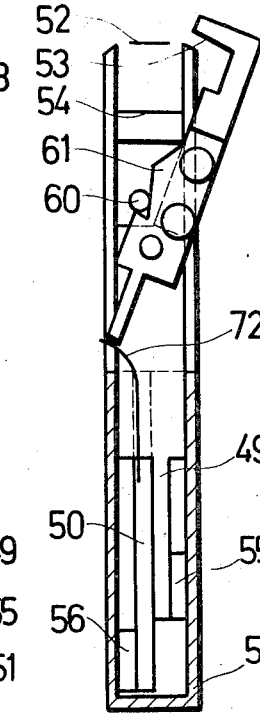
Figure 12C:
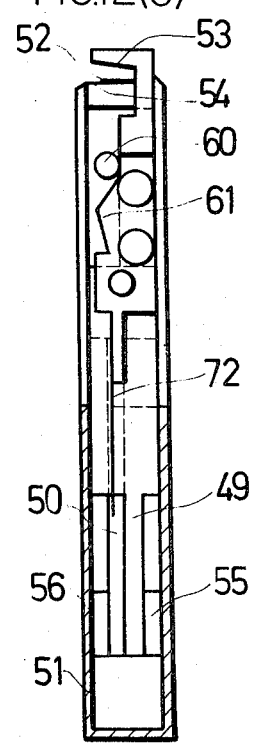
Figure 12D:
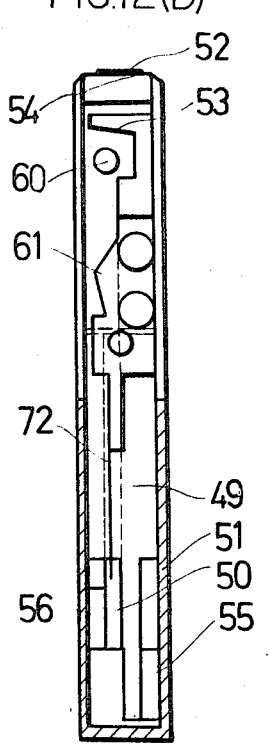
Figure 14E:
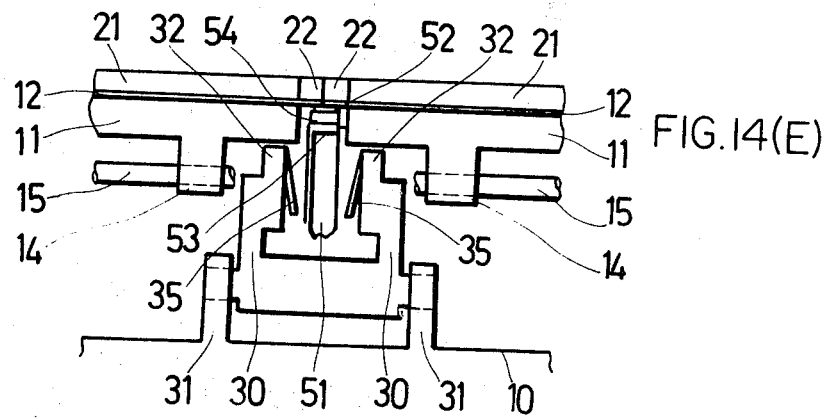
Figure 14F:
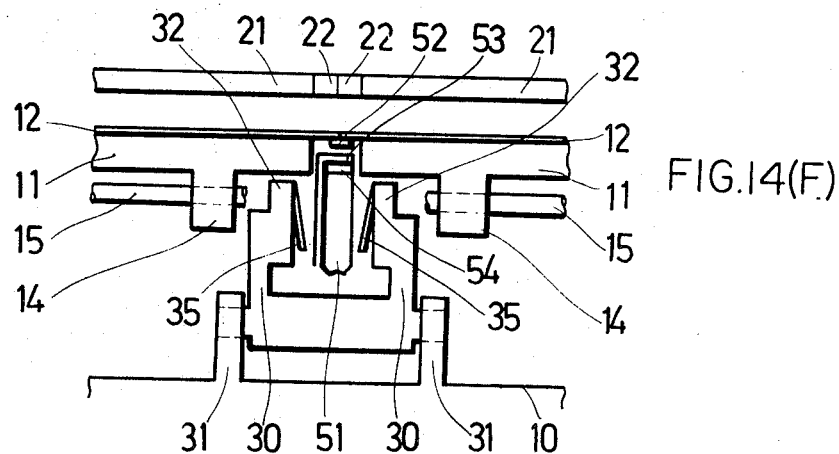
Figure 14G:
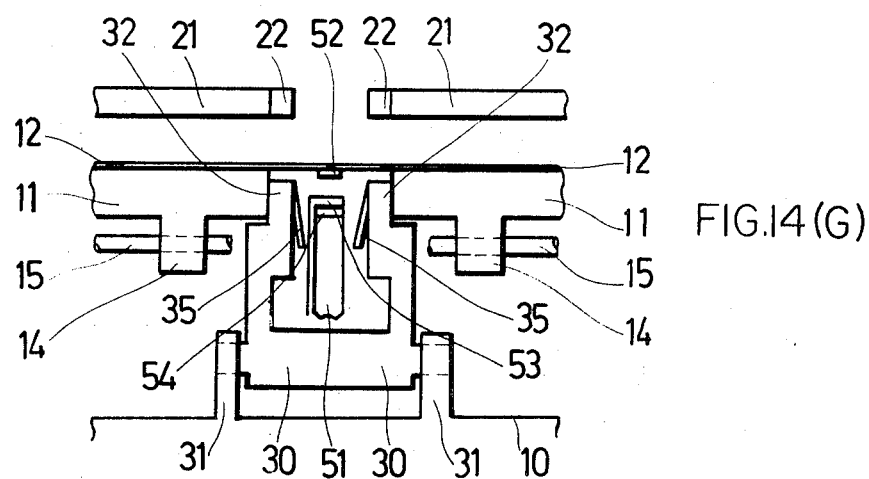
Figure 15:
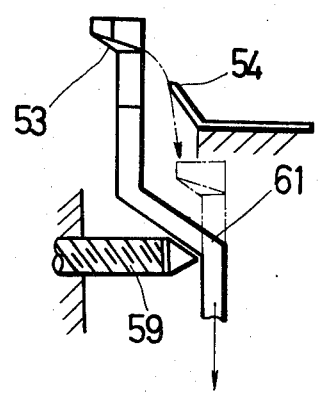

FIGS. 8, (A) to (C), explain schematically the operations of the mechanism for position displacement of the video tape cutter of FIG. 6;

FIG. 9 is an enlarged view taken along line B—B of FIG. 3;

FIG. 10 is an enlarged view showing a condition in which a holder plate for a splice tape cutter has been moved to its upper position of FIG. 9;

FIG. 11 is a cross-sectional view taken along line D—D of FIG. 9;

FIGS. 12, (A) to (D), explain schematically the operations of the mechanism for position displacement of the splice cutter of FIG. 9;

FIG. 13 is a cross-sectional view taken along line C—C of FIG. 3;

FIGS. 14, (A) to (G), explain schematically the operations of the mechanism for position displacement of the cutter support for the video tape cutter, the holder plate for the splice tape cutter, the carriage and the encloser according to the invention; and FIG. 15 is an enlarged side view showing a splice tape cutter of FIG. 9.

Figure 1A:
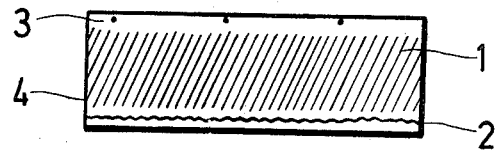
Figure 1B:
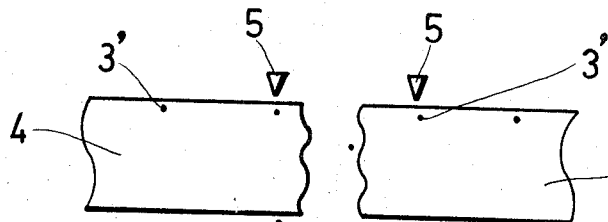
Figure 1C:
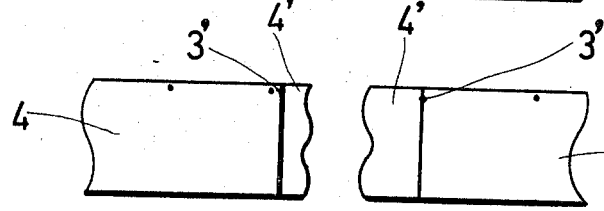
Figure 1D:
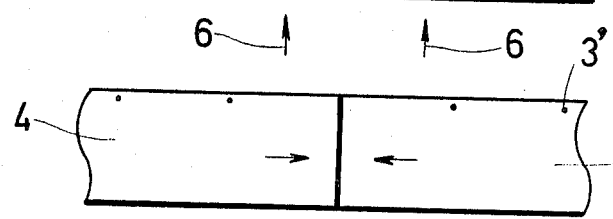
Figure 1E:
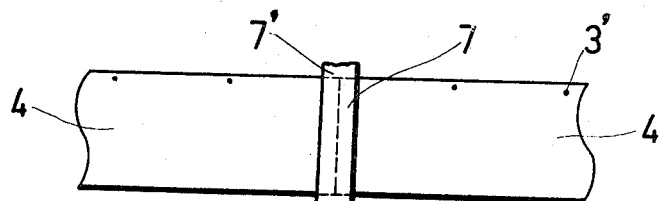
Figure 1F:
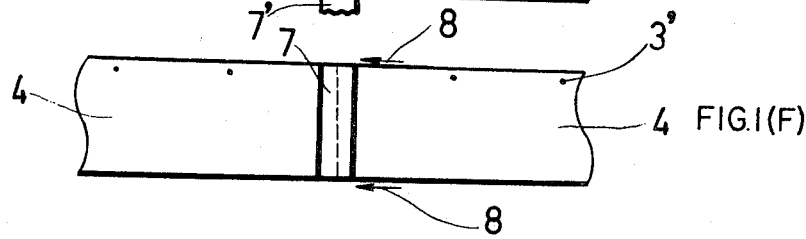
Figure 2:
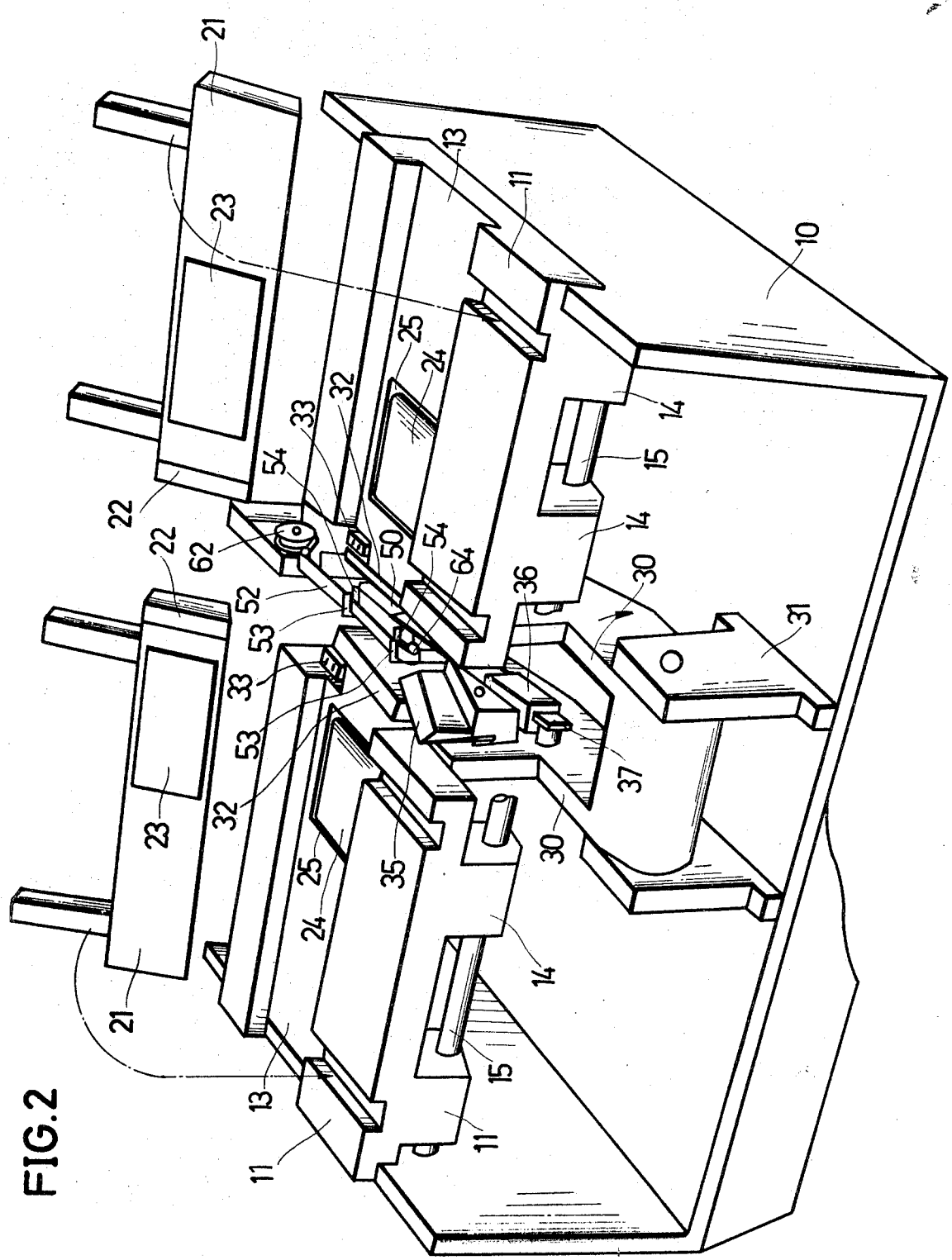
FIG. 2 is an isometric view showing a part of driving mechanism of an automatic tape splicer embodying the invention.
Figure 4:
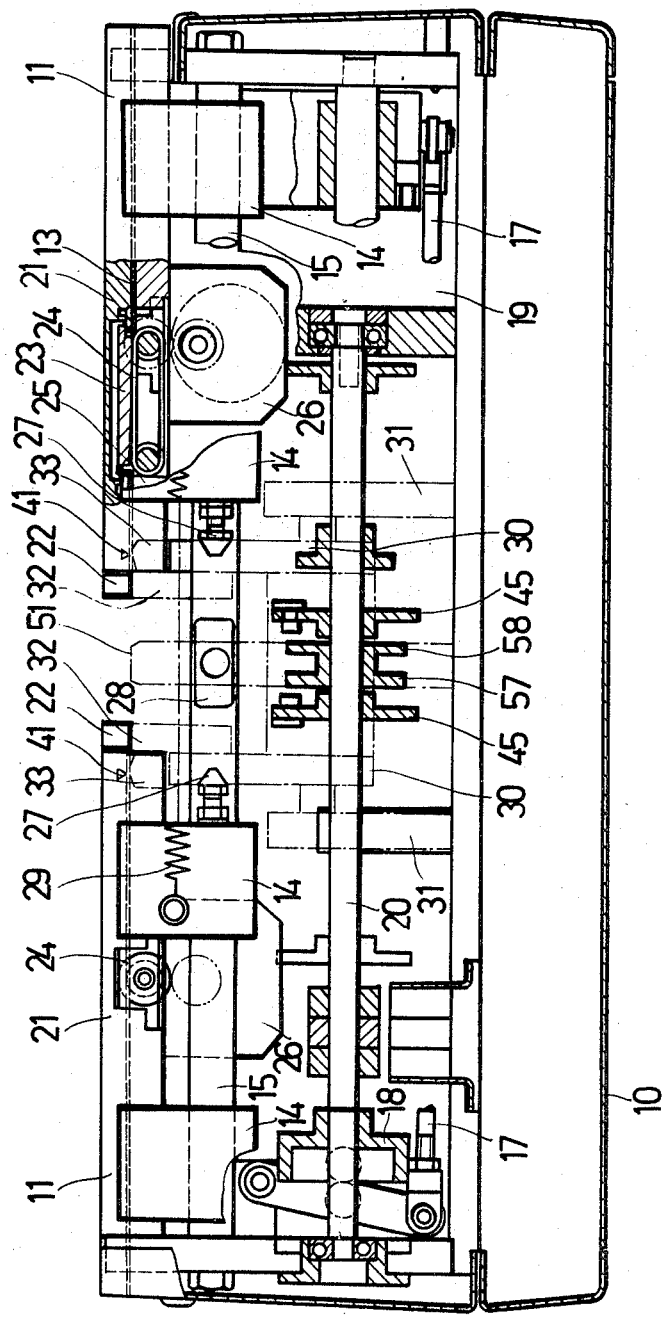
FIG. 4 is a longitudinal sectional view, of which a portion is broken away, of an automatic tape splicer according to the invention.

Referring initially to FIGS. 2 to 4, reference numeral 10 is a tape splicer housing, and further numerals 11 and 11 designate bilaterally opposed carriages each having a runway 13 for a tape 12, such as a video tape, a photographic film or the like, on its top surface. The carriages 11 and 11 are also provided on the lowest faces thereof with bearing boxes 14 and 14 which are mounted in a freely sliding manner on stationary shafts 15 and 15 provided in the housing 10, so that the carriages are supported so as to slide along said shafts 15 and 15 respectively. The bearing boxes 14 and 14 are operatively connected to a driving shaft 20 of a motor 19 through a lever 16, an interlocking shaft 17 and a cam member 18.

Reference numerals 21 and 21 are enclosers pivotably mounted on each carriage 11 and 11 so as to closely engage with the runways 13 and 13 respectively. On the each of the enclosers 21 and 21 an upper mouthpiece 22 is provided at an end thereof adjacent to the central portion of the tape splicer and a backing plate 23 is also provided so as to press the tape laid on the runway 13.

Reference numeral 24 is a tape feed belt which is provided in an opening 25 in the runway 13, and is driven from its associated servomotor 26. Provided on the carriages 11 and 11 are, respectively, stoppers 27 and 27 each adapted to be butted against a stationary platform 28, and numeral 29 designates a tension spring suspended between the bearing boxes 14 and 14 on the opposed carriages 11 and 11.

Figure 5:
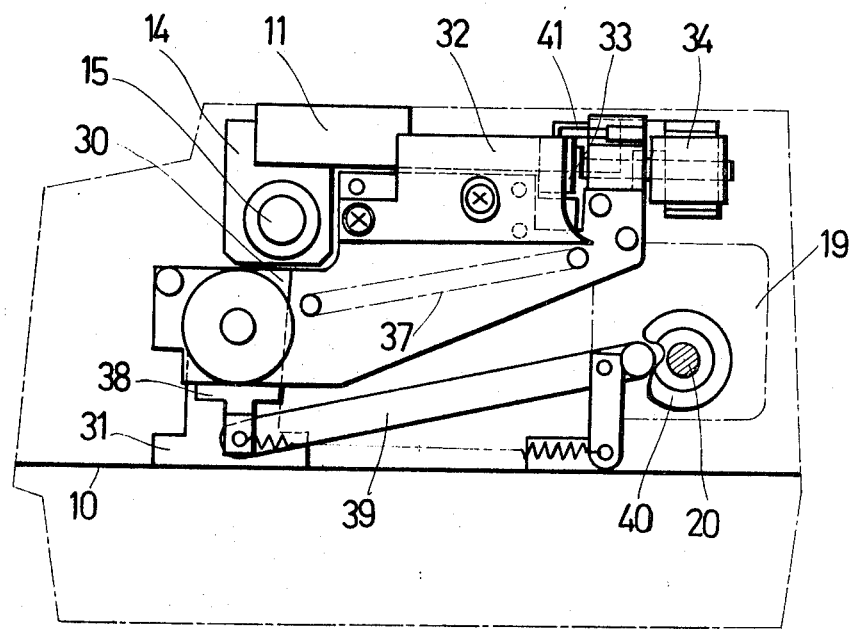
FIG. 5 is a cross-sectional view taken along line A—A of FIG. 3.

Reference numerals 30 and 30 are cutter supports pivotably mounted on opposed pedestals 31 and 31 arranged in the housing 10 as shown in FIG. 5. On the upper portions of said cutter supports 30 and 30, there are provided a pair of lower mouthpieces 32 and 32, detector heads 33 and 33, their associated vibrators 34 and 34, holder plates 36 and 36 for cutter blades 35 and 35 effective to cut the video tape 12, and rods 37 and 37 along which the holder plates 36 and 36 may slide in a reciprocating manner. A downward projection 38 from any one of the cutter supports 30 and 30 is drivingly connected, through a lever 39, to a cam member 40 provided on the driving shaft 20.

Reference numerals 41 and 41 designate fixed magnetic pointers each provided on the upper portion of the detector head 33, 42 and 42 are tension springs each extending between the holder plate 36 and the slidable shaft 37, and further numerals 43 and 43 designate stoppers which are arranged in a longitudinally spaced manner so as to restrict the movement of the holder plates 36 and 36 and which are also connected to each cutter through levers 44. The forward stoppers 43 and the holder plates 36 are, respectively, engageable with laterally projecting pins 47 and 48 planted on cam wheels 45 and 46 mounted on the driving shaft 20.

As will be seen from FIG. 9, there are provided other holder plates 49 and 50 which are designed so as to move vertically with respect to a splice tape supporting member 51 juxtaposed between the cutter supports 30 and 30. Such holder plates 49 and 50 have, respectively, supported thereon a first pair of longitudinally spaced upper cutter blades 53 and 53 and a second pair of similarly spaced lower cutter blades 54 and 54, and further are connected, through levers 55 and 56, to cam member 57 and 58 on the driving shaft 20. It will be thus appreciated that relative vertical movements of the holder plates 49 and 50, with the upper and lower cutter blades 53,53 and 54,54 on them may cause cutting operation of a splice tape 52 fed on the splice tape supporting member 51.

Reference numerals 59 and 59 designate setscrews to press the upper cutter blades 53 each of which has an inverted L-shape and also has resilient property. Numerals 60 and 60 are pins fixed on the holder plates 50 and effective to engage the corresponding shoulders 61 of the upper cutter blades 53 by means of the tension of springs 72, said shoulders 61 being integrally constructed with the upper blades 53 mounted on the holder plates 49. Numeral 62 is a reel wound with splice tape 52 and numeral 63 is a lever having a tape-binding roller 64 at the free end thereof.

Reference numerals 65 and 65 are levers for locking the enclosers 21 and 21 in their closed position and each lever is drivingly connected through levers 66 to cams 67 mounted on the driving shaft 20 as shown in FIG. 13. Reference numerals 68 and 68 are springs effective to urge the enclosers 21 towards their opened position, 69 is a switch (FIG. 3) to be operated when the cutting place of the tape is detected, 70 is a switch to be operated when the operation of the tape lever 63 finishes, and further 71 is a switch to be operated in connection with the enclosers 21 when the splicing operation is finished.

The operation of the principal portions of the tape splicer of this invention will be hereinafter fully described with reference to FIGS. 5, 6, 9, 10, and 14.

Opening the enclosers 21 and 21 before the driving mechanism of the tape splicer of the invention is operated, two lengths of tape 12 to be connected together end to end should be respectively laid on the recessed runways 13 and 13 on the carriages 11 and 11 respectively. As soon as the enclosers 21 and 21 are respectively closed so that the two lengths of tape 12 may be pressed by the backing plates 23 and 23, and then locked by means of the lever 65, the tapes 12 and 12 may be transversally moved by the belt 24 driven from the servomotor 26 and in the meanwhile each editing pulse 3 along the lengths of tape 12 may be detected between the fixed magnetic pointer 41 and the detector head 33 which is actuated with electricity generated by the vibrator 34. When each end of the tapes 12 and 12 to be spliced along a video recording track 1 is aligned with the edges of the upper mouthpieces 22, the switch 69 operates to indicate to stop the servomotor 26, and thus the particular positioning of the tapes 12 and 12 to be connected is completed. On the other hand, when the splice tape 52 is drawn from the reel 62 to the binding roller 64, the switch 70 operates to indicate to finish the operation of the tape lever 63. Upon these two switches 69 and 70 being actuated, the motor 19 commences to drive the driving shaft 20 which, in turn, operates in regular sequence the carriages 11 and 11, cutter supports 30 and 30, holder plates 36 and 36, stoppers 43 and 43, other holder plates 49 and 50, and lever 65 by means of the cams 18, 40, 45, 46, 57, 58, and 67 mounted on the driving shaft 20. That is, the cutter supports 30 and 30 are originally in their elevated position so as to interpose the tape 12 between the upper and lower mouthpieces 32 and 22 as shown in FIG. 14 (A). Next, the holder plates 36 and 36 may, when released from the stoppers 43 and 43, slide upon the rods 37 by the force exerted thereon by the springs 42, so that the cutter blades 35 and 35 move upwardly along the pair of upper and lower mouthpieces 22 and 32 to shear off the ends of tapes 12 and 12 transversely of the video recording track as shown in FIG. 14 (B), while sheared pieces drop into a suitable rubbish box, not shown in this figure. Then, the cutter supports 30 and 30 descend by the action of the lever 39, as shown in FIG. 6, resulting in that the lower mouthpieces 32 and lower cutter blades 35 descend below the carriages 11 as shown in FIG. 14 (C). And, after the lower mouthpieces 32 and cutter blades 35 descend below the carriages 11, the opposed carriages 11, including the tapes 12 and the enclosers 21 slide simultaneously towards each other along the fixed shafts 15 by the action of the levers 16 to cause a pair of the upper mouthpieces 22 and 22 to butt against each other as shown in FIG. 14 (D). In this state, the straight cut ends of the left and right tapes 12 and 12 are closely butted and a length of the splice tape 52 extends below such butted ends of the tapes, Without a break, the levers 55 and 56 shown in FIG. 10 operate to elevate the holder plates 49 and 50 to press the splice tape 52 against the butted ends of the tapes 12 by means of a pair of the lower blades 54 and 54. During this operation, the shoulders 61 of the upper blades 53 and 53 may engage the fixed pins 60 with the result that the blades 53 are brought into a position where they overhang above the splice tape 52. Thereafter, the upper blades 53 and 53 descend and cooperate with the lower cutter blades 54 and 54 to shear the splice tape 52 at two positions spaced across the video tapes 12 ad shown in FIG. 14 (E) and FIG. 15. In this way, a particular cycle of the splicing operation has come to its completion. Then, the lever 66 acts to cause the lever 65 to release the enclosers 21 and 21, and the spring 68 acts to open the enclosers 21 and 21 as shown in FIG. 14 (F), resulting in that the levers 16 and 16 cause a pair of the carriage 11 and 11 to slide in the opposite directions to the original positions as shown in FIG. 14 (G) and also cause the switch 71 to stop the motor 19 in succession.

Different drive means may be provided in combination for the carriages 11 and 11 and enclosers 21 and 21, conveyor belts 24 and 24, detector heads 33 and 35, lower mouthpieces 32 and 32, top cutters 35 and 35, and splice tape 52 and splice tape cutters 53 and 53, 54 and 54 therefor. Alternatively, these units or means may be controlled by the single drive means.

The operation of the tape cutters 35 are such, as shown in FIG. 8, that the holder plates 36 are first maintained at their lower positions by engagement with he stoppers 43 and shown in FIG. 8 (A), then moved along the shaft 37 toward the upper positions as a result of the action of the springs 42 when released from the stoppers 43 as shown in FIG. 8 (B) and returned to the initial lower positions when the cutter supports 30 descend as shown in FIG. 8 (C), and finally locked again at the lower positions by the stoppers 43 without a break.

Also, the operation of the splice tape cutters 53 and 54 are such, as shown in FIG. 12, that the cutter blades 53 and 53 are at their lower positions with the lower blades 54 and 54 as shown in FIG. 12 (A) move upwardly while swinging when the shoulders 61 thereof clear over the fixed pins 60 as shown in FIG. 12 (B), the lower blades 54 and 54 then move upwardly to interpose the splice tape between a pair of the upper and lower blades 53 and 54 as shown in FIG. 12 (C), where upon the splice tape 52 is sheared as the upper blades 53 and 53 descend to their original lower positions while the lower blades 54 and 54 are positioned in their upper positions as shown in FIG. 12 (D), and finally the lower blades 54 and 54, also return to their original lower positions without a break. And the width of each of the recessed runways 13, enclosers 21, and lower mouthpieces 32 and the blade width of the cutter blades 35, 53, and 54 may be of the same size to the tapes 12 and 12, or may be provided so as to be adjusted selectively.

In the video tape splicer designed as heretofore disclosed, except for the operations of arranging the video tapes 12 and 12 in the recessed runways and of drawing the splice tape 52 from the reel to the binding roller, the five stages of operation essential to the tape edition can be automatically carried out so that it facilitates the tape editing work with many advantageous results namely, improvement in accuracy of the tape edition, for example the maximum measured error in the trial manufactured splicer of this invention was about 0.02 mm. and noises did not occur, secondly reductions of the hours required for the tape editing work, for example in the trial-manufactured splicer it only took 23 seconds from the control pulse detecting to the completion of the splicing operation: Positioning: 3 seconds, shearing and butting: 9 seconds, splicing and cutting: 2 seconds, and returning to the original state: 9 seconds.

Furthermore, the splicer of the invention can be applied in editing various kinds of tape, such as monochromatic or color video tape, and video tape or recording tape carrying no signals.

Since the splicer as heretofore disclosed is designed such that the mechanisms for the five steps of operation essential to the tape editing are drivingly connected to a plurality of cams 18, 14, 45, 46, 57, 58 and 67 mounted on the driving shaft 20 driven from the single motor 19, there may no fear of a time lag in sequential operations of the mechanisms, and also it may become easy in operation without trouble; even if trouble occurs once, it can be easily detected and repaired, and it may be simple in manufacture as well as reasonable in cost.

Furthermore, according to this invention, since the splicer is constructed such that the lengths of tape 12 to be jointed together end to end are first fixed on the carriages 11 and 11 by locking them between the recessed runways 13 and 13 on the carriages 11 and 11 and the enclosures 21 and 21 closed to fit in the runways, then the five steps of tape splicing operation are carried out on such tapes as kept on the carriages in the condition as described above, and the tapes thus jointed or connected together end to end become accessible after opening of the enclosures 21 and 21, there is no fear of injury or damage of tapes during splicing operation and further holding of the tapes is easy.

From the foregoing, it is to be understood that a novel and improved tape splicer in which the tape-splicing operation to joint or connect two lengths of tape together end to end may be fully automated, involves the steps of determining particular positions of each tape to be connected, cutting away the lugs of each tape at the connecting positions, butting the cut end of the tapes against each other so as to adhere, bonding a splice tape on the butted end of the tapes, and finally cutting away the lugs of the splice tape at both sides of the tape.

The embodiments of the invention in which an exclusive property or privilege is claimed are defined as follows:

1. An automatic tape splicer comprising a housing, a pair of bilaterally opposed carriages on which two lengths of tape are positioned respectively, detecting means for detecting the position of said tape to be connected, first cutting means for cutting the ends of said tape after being accurately positioned by said detecting means, moving means for moving said pair of carriages to be butted against each other together with two lengths of tape thereon, bonding means for bonding a splice tape on said butted end of the tapes, and second cutting means for cutting the lugs of the splice tape at both sides of the tape, wherein said moving means as well as said first and second cutting means are operated in mutual cooperation by a driving means.

2. An automatic tape splicer comprising a housing, a pair of bilaterally opposed carriages on which two lengths of tape are positioned respectively, a pair of enclosers pivotably mounted on each carriage so as to close or open, upper mouthpieces arranged at a butting end of said enclosers, lower mouthpieces arranged at a butting end of said carriages corresponding to said upper mouthpieces, means for detecting the position of said tapes to be connected, means for cutting the end of said tapes at said connecting positions, means for moving said pair of carriages to be butted against each other together with two lengths of tape thereon, splice tape holder means approaching the butted ends of the tapes when said lower mouthpieces are retracted from said butting position, means for cutting the ends of the splice tape on both sides of the tape, said carriages being each provided with a runway for the tape, each runway having an opening wherein a tape-feedbelt is provided and driven by a servomotor means, and wherein stoppers are provided on the carriages for abutting against a stationary platform.

3. An automatic tape splicer as defined in claim 2, wherein the carriages are provided with bearing boxes on the lowest faces thereof, which bearing boxes are mounted in a freely sliding manner on stationary shafts provided in the housing, and the bearing boxes being connected to a driving shaft of motor means via a lever, an interlocking shaft and a cam.

4. An automatic tape splicer comprising a housing, a pair of bilaterally opposed carriages on which two lengths of tape are positioned respectively, a pair of enclosers pivotably mounted on each carriage so as to close or open, upper mouthpieces arranged at a butting end of said enclosers, lower mouthpieces arranged at a butting end of said carriages corresponding to said upper mouthpieces, means for detecting the position of said tapes to be connected, means for cutting the end of said tapes at said connecting positions, means for moving said pair of carriages to be butted against each other together with two lengths of tape thereon, splice tape holder means approaching the butted ends of the tapes when said lower mouthpieces are retracted from said butting position, means for cutting the ends of the splice tape on both sides of the tape, said means for cutting the lugs of the splice tape include holder plates which are vertically movable with respect to a splice tape supporting member between cutter supports pivotably mounted on opposed pedestals arranged in the housing, and wherein a first pair of longitudinally spaced upper cutter blades and a second pair of longitudinally spaced lower cutter blades are supported on said holder plates.

5. An automatic tape splicer as defined in claim 4 wherein said holder plates are connected to cams on a driving shaft of motor means via levers, whereby vertical movements of said holder plates with the upper and lower cutter blades perform the cutting of the splice tape.

6. An automatic tape splicer as defined in claim 5, wherein said carriages are each provided with a runway for the tape, each runway having an opening wherein a tape-feed belt is provided and driven by a servomotor means, and stoppers being provided on the carriages and adapted to be butted against a stationary platform.

* * * * *